(12) United States Patent
Gilmour et al.

(10) Patent No.: US 7,948,929 B1
(45) Date of Patent: May 24, 2011

(54) SYSTEM FOR GENERATING CONSTANT ENVELOPE SIMULTANEOUS DATA AND RANGING WAVEFORM WITH ANTI-JAM PROPERTIES

(75) Inventors: Paul A. Gilmour, Bloomfield, NJ (US); Gene L. Cangiani, Parsippany, NJ (US); Stephen P. Stoyanov, Clifton, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 193 days.

(21) Appl. No.: 12/467,480

(22) Filed: May 18, 2009

(51) Int. Cl.
*H04B 7/185* (2006.01)
(52) U.S. Cl. ......................................... 370/316; 370/276
(58) Field of Classification Search .................. 370/276, 370/316; 375/130, 140–153, 219, 222, 259, 375/261, 273, 295, 298, 300, 302
See application file for complete search history.

(56) References Cited

U.S. PATENT DOCUMENTS

2007/0176676 A1* 8/2007 Pratt et al. ....................... 330/10
* cited by examiner

*Primary Examiner* — Derrick W Ferris
*Assistant Examiner* — Mang Yeung
(74) *Attorney, Agent, or Firm* — Edell, Shapiro & Finnan, LLC

(57) ABSTRACT

A communication system generates a constant-envelope composite signal containing at least two signals whose power levels, bandwidths, and/or data rates are independently controllable. Binary offset carrier (BOC) modulation is applied to the signals to be combined in the composite signal. The BOC modulated signals are then combined via interplex modulation to form a constant-envelope composite signal in which the constituent signals modulate different offset carriers. For example, real BOC modulation can be used to generate a ranging signal in edge portions of the transmission band of the composite signal, while complex BOC modulation can be used to generate a frequency agile data signal in a center portion of the transmission band. Such a signal can be used for full duplex communications in satellite crosslinks. The interplex modulation allows independent control of the power levels of the two signals while maintaining a constant envelope, permitting use of saturated RF amplifiers.

23 Claims, 12 Drawing Sheets

SYSTEM FOR GENERATING CONSTANT ENVELOPE SIMULTANEOUS DATA AND RANGING WAVEFORM WITH ANTI-JAM PROPERTIES

BACKGROUND

Point-to-point communication links known as "crosslinks" between satellites have several functions, including transmitting data between the satellites, comparing clock times and frequencies on the satellites, and measuring the distance between the satellites, i.e., ranging. Current generation crosslinks have two different operating modes, one for transmitting data and one for performing ranging. However, there is a need for next generation crosslinks to continuously perform both data transmission and ranging. Moreover, these functions would preferably be performed with full-duplex communications between two satellites, so that both satellites will simultaneously transmit and receive data and ranging information. For this application, it would be desirable for a waveform for a radio frequency (RF) satellite crosslink to meet the following requirements: a constant envelope waveform for efficient non-linear RF amplification in the transmitter; a high data rate, e.g., on the order of at least about 2 Mbps; a wide bandwidth; high accuracy ranging (e.g., sub-nanosecond accuracy); jam-resistant operation in the presence of non-hostile jamming; and full independence in choice of data and ranging signal power levels. More generally, it would be desirable to transmit a plurality of signals with independent power levels and bandwidths within a constant-envelope composite signal.

SUMMARY

Described herein is a system for generating a constant-envelope composite signal containing at least two signals whose power levels, bandwidths, and/or data rates are independently controllable. Binary offset carrier (BOC) modulation is applied to the signals to be combined in the composite signal. The BOC modulated signals are then combined via interplex modulation to form a constant-envelope composite signal in which the constituent signals are at different offset carriers within the transmission band of the composite signal. For example, real BOC modulation can be used to generate a ranging signal in edge portions of the transmission band of the composite signal, while complex BOC modulation can be used to generate a frequency agile data signal in a center portion of the transmission band. This transmission scheme can be used for full-duplex RF satellite crosslinks with both satellites simultaneously transmitting and receiving data and ranging information using a constant envelope waveform that provides a high data rate, a wide bandwidth, high accuracy ranging, and fully independent data and ranging power levels. The ability to make the data signal frequency agile provides resistance to jamming or narrow-band interference.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
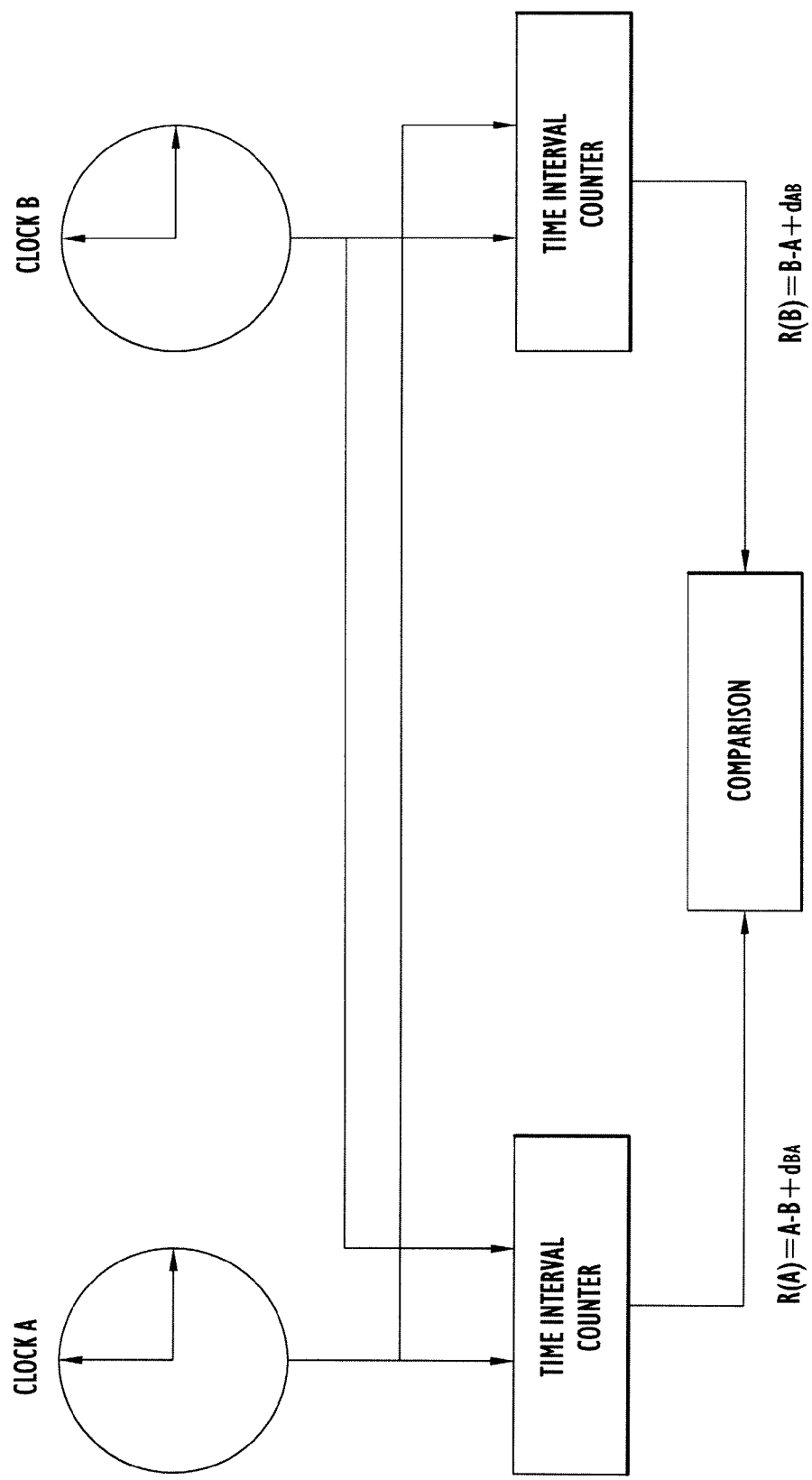
FIG. 1 is a block diagram illustrating a two-way time transfer technique for determining the range between two communication devices.

A two-way time transfer technique is currently the most accurate method for transferring time between clocks of two communication devices, and also gives excellent results when ranging between two satellites. FIG. 1 conceptually illustrates this technique and shows the clocks on two satellites, Clock A and Clock B. The reading on the Time Interval Counter (TIC) associated with Clock A, R(A), measures the difference in time between the one pulse per second (1 pps) from Clock A and the 1 pps from Clock B, delayed by the channel propagation time, $d_{BA}$. Similarly, the TIC reading associated with Clock B, R(B), measures the difference between the 1 pps from Clock B and the 1 pps from Clock A, delayed by the channel propagation time, $d_{AB}$. It is assumed that there is negligible delay for the 1 pps from each clock to reach its own TIC. If the readings on the two TICs are subtracted, the result is:

$$R(A)-R(B)=2(A-B)+(d_{BA}-d_{AB}) \qquad (1)$$

If the channel is reciprocal, so that the propagation times in each direction are equal, then $d_{BA}-d_{AB}=0$, and the difference in the clock times is:

$$A-B=[R(A)-R(B)]/2 \qquad (2)$$

If the readings on the two TICs are added, the result is:

$$R(A)+R(B)=A-B+d_{BA}+B-A+d_{AB}=d_{BA}d_{AB} \qquad (3)$$

If the propagation delays are equal, $d_{BA}=d_{AB}=d$, then:

$$d=[R(A)+R(B)]/2 \qquad (4)$$

The range can then be solved for by dividing the propagation delay by the propagation speed in the channel. The propagation speed is very close to the speed of light, c. Therefore the range is:

$$\text{Range} \approx d/c \qquad (5)$$

There are at least two systems which have been proposed that perform two-way time transfer and approach meeting the requirements listed previously. The first of these systems operates according to the scheme depicted in FIG. 2. In this approach, the modems send direct sequence spread spectrum (DSSS) signals to each other via a satellite transponder that is in common view of both Very Small Aperture Terminal (VSAT) ground stations. For example, a modem operating in a 2.5 MChip per second mode truncates a long PN sequence at 10,000 chips, which corresponding to 4 milliseconds. Each 10,000 chip sequence is used to spread one data bit. This gives a data rate of 250 bps. This low data rate is sufficient for exchanging counter data to achieve two-way time transfer, i.e., to perform the computations described previously. Note that this system has a variety of available spreading rates, from 0.5 to 20 MChip per second. This approach uses a satellite communications channel to simultaneously send two-way data and ranging signals; however, this scheme uses VSAT ground stations rather than direct crosslinks between satellites.

This first system, operating at 2.5 MChip/second, has a data rate of 250 bps. This low data rate is sufficient for exchanging counter data to achieve two-way time transfer, but it falls far short of the desired 2 Mbps data rate noted above. Even in a 20 Mcps mode, this system will have a data rate of only 2000 bps for PN sequences of length 10,000.

A potential way to get higher data rates would be to use shorter PN sequences to spread each data bit. For example, in order to meet the desired data rate of 2 Mbps using one PN sequence per data bit, the modem could use PN sequences of length 63. This would result in a 126 Mcps spreading symbol rate, which is feasible to implement. Note, however, that a length 63 sequence is very short, and consequently will have poor autocorrelation properties, with high correlation sidelobes. This will result in poor rejection of multipath and also a poor processing gain against interference ($10*\log 10(63) = 18$ dB). These problems that result from the shortness of the PN spreading sequence make it impractical to obtain a high data rate using the direct sequence spread spectrum technique used by the modem of this first system.

Moreover, this system's approach to combining ranging with data compromises signal level independence. The modem of this system was originally designed with a ranging waveform to be used on the same satellite channel as other signals, such as direct TV analog FM, direct TV digital QPSK, or other communication traffic. This would suggest that the low data rate of the waveform could be compensated by adding it to a high-data-rate signal that did not interfere spectrally with the waveform. The problem, however, is that in order for the waveform to be added to the data signal, certain signal power level constraints must be enforced. If the satellite channel has non-linear amplification (as most do), then the ranging signal will interfere with the data signal due to in-band intermodulation products. This means that the ranging signal is constrained to have a much lower power level than the data signal in order to reduce the intermodulation products. If the satellite channel uses linear (or quasi-linear) amplification to reduce the intermodulation products between the ranging and data signals, then the total signal level is constrained to be "backed off" from the amplifier's saturation level. This is inherently less efficient than operating the amplifier in a non-linear, saturated mode.

Figure 3:
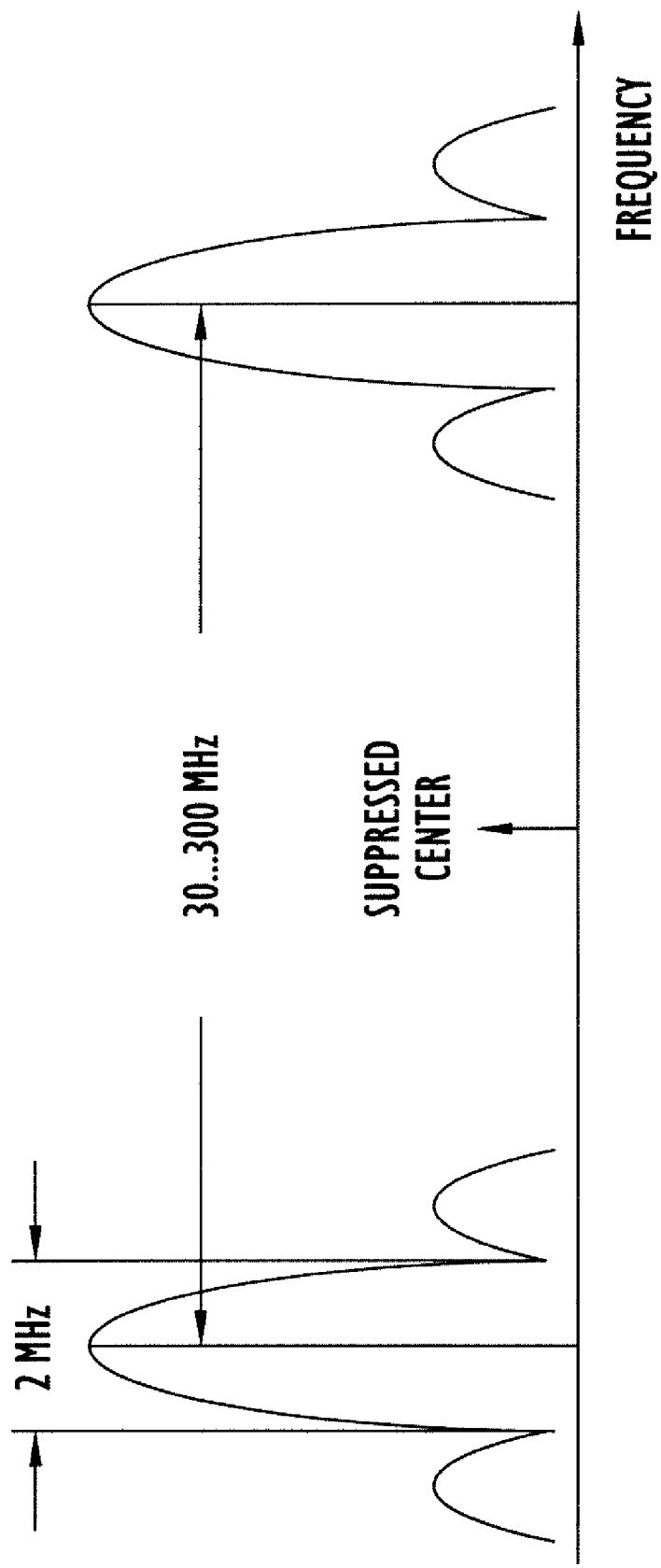
FIG. 3 is a graph illustrating a frequency characteristic of a narrowband spread spectrum signal shifted to both edges of a transmission channel via tone modulation.
Figure 4:
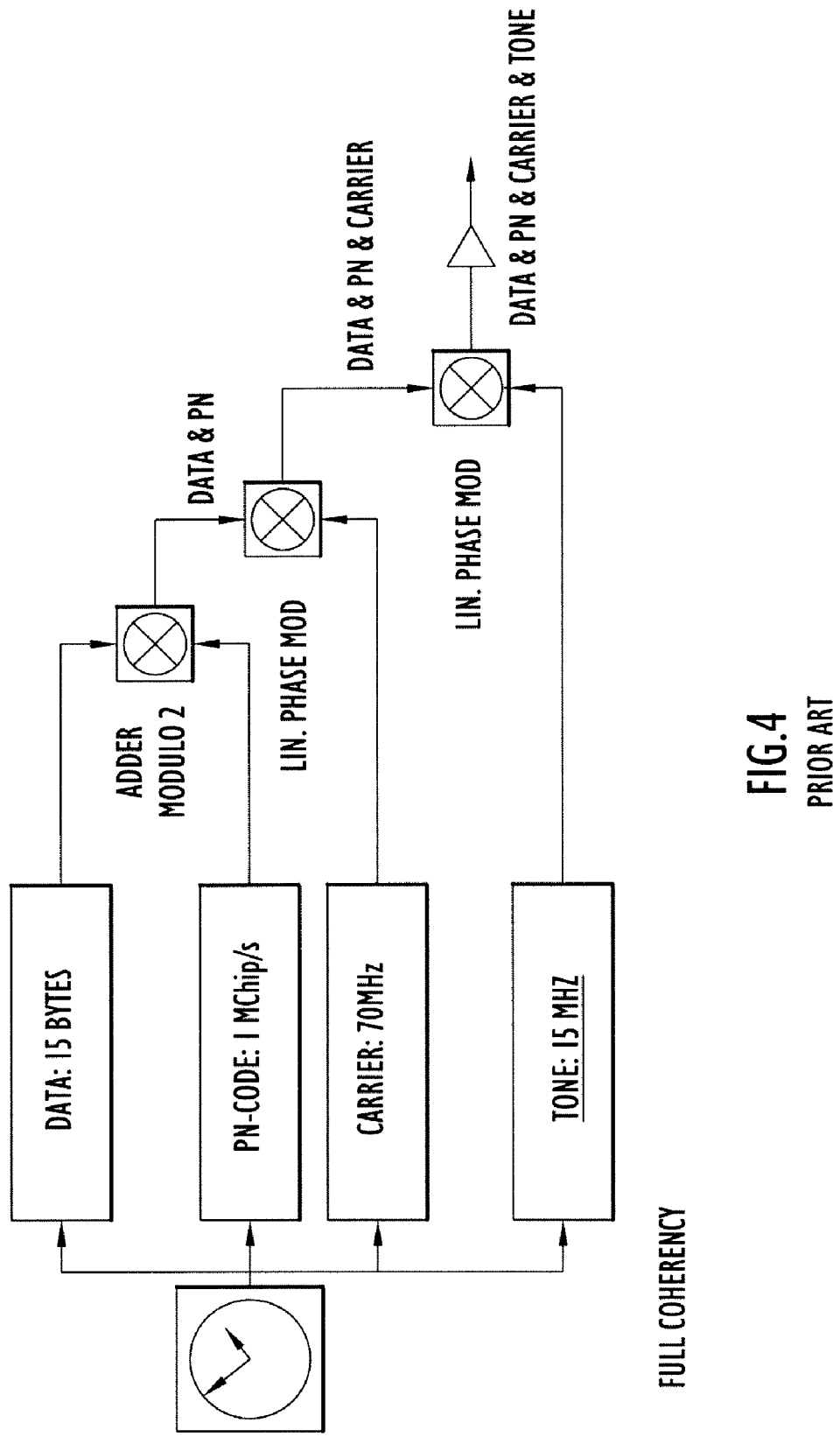
FIG. 4 is a block diagram illustrating a linear phase modulation scheme for implementing tone modulation.

It has been proposed to use tone modulation with this first system to shift a narrowband spread spectrum signal to both edges of the transmission channel. As shown in FIG. 3, this leaves the middle of the channel free for other information, such as a data signal. The wide frequency spacing between the upper and lower sidebands due to the tone modulation allows precise time resolution in the ranging algorithm. The spread spectrum waveform allows the ambiguity of the tone ranging to be resolved. The combination of tones and spread spectrum gives high-accuracy ranging. This tone modulation is proposed to be implemented via linear phase modulation, as shown in FIG. 4. Unfortunately this implementation has the same problem described previously, i.e., that combining the tone modulated spread spectrum waveform with a high data rate waveform will lead to compromises of signal level independence.

Figure 2:
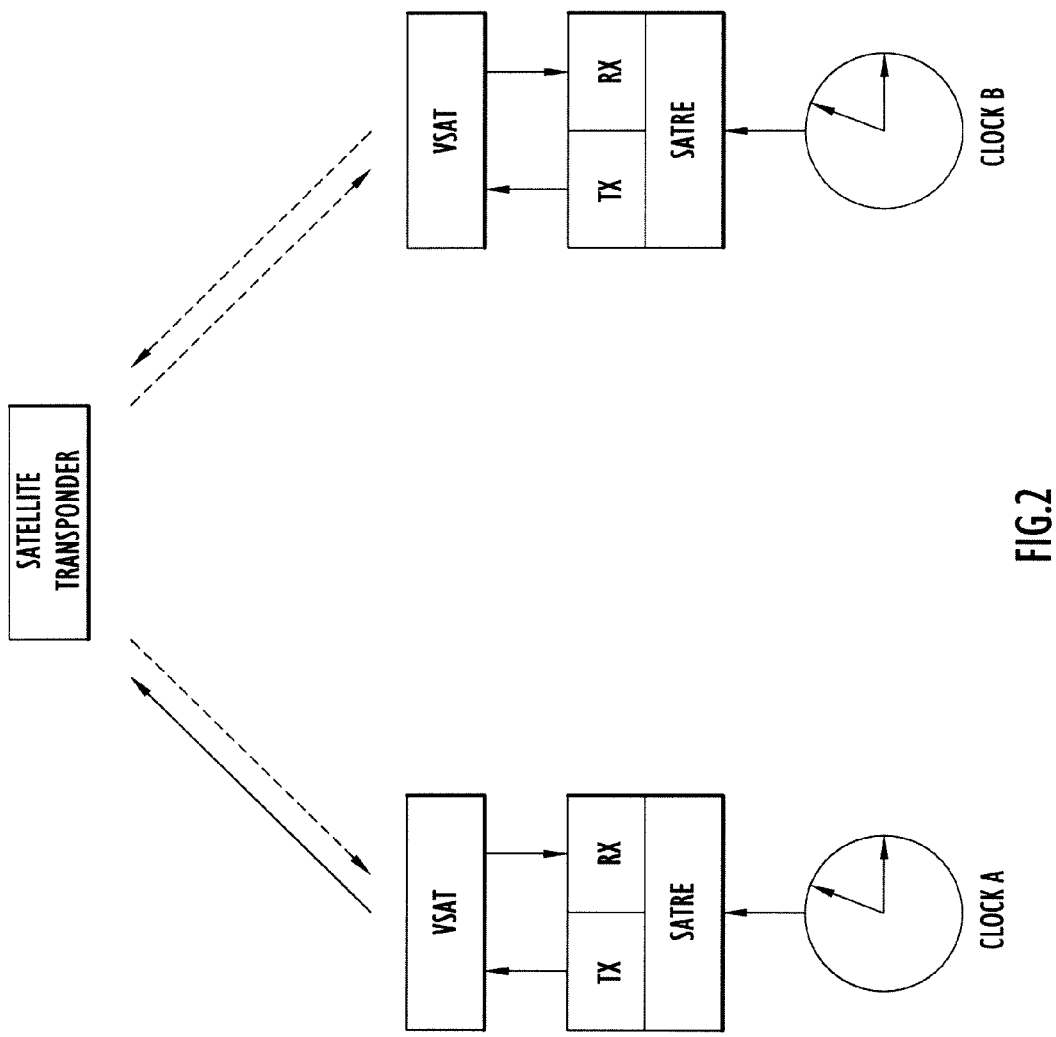
FIG. 2 is a block diagram illustrating a system for performing a two-way time transfer technique in which modems at two ground stations send signals to each other via a satellite transponder that is in common view.

A second system for perform two-way time transfer involves a block diagram scheme similar to that in FIG. 2. However, instead of sending its own DSSS signals, this system relies on the physical layer data signals sent by a high-rate satellite data modem. Typically, such modems have a synchronous physical layer with constant delay over short measurement intervals. In this second scheme, an "on-time marker" (OTM) is inserted into the data stream. In each direction, the modem transmitter measures the clock time at which the OTM is sent, and the modem receiver measures the clock time at which the OTM is detected. These times are communicated between the modems over the data channel to achieve two-way time transfer, i.e., to perform the computations previously described.

One problem with the approach of this second system is that the accuracy obtainable by this method is dependent on the underlying data rate of the physical communications channel. If the system operator is already paying the price for a sufficiently high data rate, then this system gives excellent accuracy almost free. However, in systems that have only modest data rate requirements and that are power limited, this approach can be very expensive. For example, if a satellite crosslink requires only a 2 Mbps data rate, then the attainable accuracy is about 1% of the symbol time, or 5 ns for BPSK modulation. If the system needs better accuracy than this, then the system operator will have to pay for a higher data rate than is required. Increasing the data rate requires improving the link margin by adding transmitter power, making the antennas larger, etc.

To summarize the shortcomings of the aforementioned first and second systems, first, the data rate and the ranging accuracy are locked together. For the first system, the ranging waveform chip rate is the data rate multiplied by the length in chips of the pn spreading sequence applied to each data bit. Making the pn spreading sequence too short results in inadequate processing gain and poor autocorrelation properties. For the second system, the ranging accuracy is directly dependent on the underlying data rate of the physical communications channel. If the data rate requirements are modest but the ranging accuracy requirements are high, then the data rate will have to be higher than necessary in order to meet the ranging accuracy requirements. Second, the power levels of the data and ranging signals are not independent. If the waveform of the first system is combined with a high data rate waveform, then there are certain constraints placed on the ranging and data signal power levels. For non-linear RF amplification, the ranging signal's power must be backed off relative to the data signal in order to reduce the level of intermodulation products that are in-band relative to the data signal. For linear (or quasi-linear) RF amplification, the total signal power (mainly the data signal power) must be backed off relative to the saturation level to keep the amplifier linear and reduce the level of in-band intermodulation products.

Additional shortcomings of these systems include vulnerability to non-hostile jamming threats. Point-to-point crosslinks between satellites orbiting the earth are exposed to at least two non-hostile jamming threats, and existing devices do not address these threats. The first is sun interference, also called sun fade. This occurs when the sun is in line with the distant satellite transmitter. The sun is a strong RF emitter, and its emissions can overpower the satellite transmitter. This is a broadband jamming threat. The second is earth transmitter interference. This occurs when two satellites are transmitting along a path that is nearly tangential to the earth's surface. If an earth transmitter is in line with the distant satellite transmitter, and if the beam of that earth transmitter is pointed at the receiving satellite, the earth transmitter's emissions can overpower the satellite transmitter. This is expected to be a narrowband fixed-frequency jamming threat. Note that both these jamming threats are unidirectional. One direction of the link will be jammed; the other direction will not be affected.

According to an embodiment of the invention, a waveform useful, for example, for a radio frequency (RF) satellite crosslink, meets at least some or all of the following requirements: a constant envelope waveform for efficient non-linear RF amplification in the transmitter; a high data rate (e.g., on the order of at least 2 Mbps); a wide bandwidth; high accuracy ranging (e.g., sub-nanosecond accuracy); jam-resistant operation in the presence of non-hostile jamming; and full independence in choice of data and ranging signal power levels.

The invention provides a combined, simultaneous data and ranging waveform that is constant envelope and therefore suitable for non-linear amplification. The data and ranging waveforms are separated into separate, fully independent waveforms. The bandwidth and power of each waveform can be modified independently. Using a digital method (binary offset carrier (BOC) modulation) for tone modulation allows spectral separation to be achieved between the ranging signal, which is at the band edges, and the data signal, which resides in the center of the band. The power of the ranging and data waveforms can be adjusted dynamically while maintaining a constant envelope. For example, the power in the ranging waveform can be increased during signal acquisition and the power in the data waveform can be increased during data transmission.

In order to counter the broadband sun interference jamming threat, the system of the present invention uses a narrowband data waveform to minimize vulnerablity. The receiver can use a bandpass filter that passes only the bandwidth of the data waveform, thereby minimizing the exposure to sun interference. While still maintaining a constant envelope, the invention allows the center frequency of the narrowband data waveform to be adjusted to avoid narrowband jamming threats. Since the jamming threat is unidirectional, the satellite that is experiencing jamming can instruct the distant transmitting satellite to change to a frequency that is not experiencing jamming.

According to an embodiment of the invention, an interplex modulation scheme is used to combine ranging and data signals into a constant-envelope composite signal. Binary Offset Carrier (BOC) modulation techniques are applied to the data and ranging signals in order to simultaneously transmit a narrowband, frequency-agile data waveform and a broadband ranging waveform within the constant-envelope composite signal.

To assist in understanding the signal scheme of the invention, relevant aspects of both interplex modulation and BOC modulation are briefly described. Interplex Modulation is a technique for generating constant-envelope, phase modulated composite signals that offers improved efficiency over standard PSK/PM systems. Using interplex modulation, three or more signals can be combined to generate a constant-envelope composite signal with minimal combining losses. A constant-envelope composite signal is highly desirable so that a highly-efficient saturated power amplifier can be used.

Figure 5:
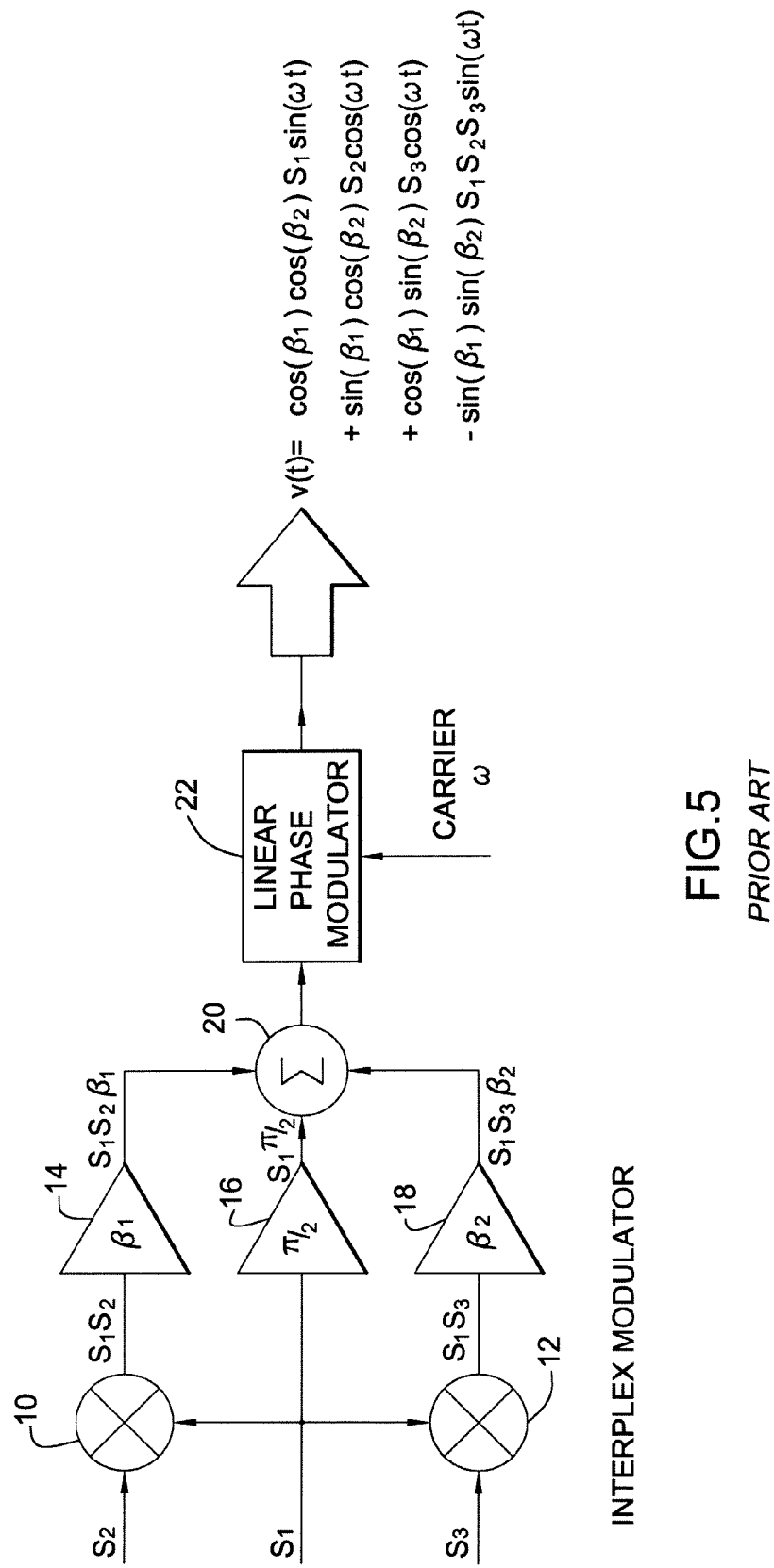
FIG. 5 is a block diagram conceptually illustrating interplex modulation of three data streams into a composite constant-envelope signal.

FIG. 5 is a schematic representation illustrating a typical interplex modulator for combining three signals. Input signals $S_1$, $S_2$ and $S_3$ are digital bitstreams of logical ones and zeros. In FIG. 5, the input signals are shown in an "analog" representation for descriptive purposes, meaning the signals assume the values of −1 and +1, corresponding to the logic values 1 and 0, respectively. Multipliers 10 and 12 perform analog multiplications of $S_1$ times $S_2$ and $S_1$ times $S_3$, respectively. Gain element 14 places a gain of $\beta_1$ on the product $S_1 S_2$, gain element 16 places a gain of $\pi/2$ on $S_1$, and gain element 18 places a gain of $\beta_2$ on the product $S_1 S_3$. A summer 20 sums the outputs of the gain elements and supplies the sum to a linear phase modulator 22. Linear phase modulator 22 also receives a $\mathrm{Sin}(\omega t)$ carrier signal and modulates the sum signal with the carrier signal to produce the composite constant-envelope output signal v(t) for transmission. The phase modulator has a nominal gain of 1 radian per unit input; therefore, the output from the phase modulator from a unit input has a one radian phase deviation of the $\mathrm{Sin}(\omega t)$ carrier. Accordingly, the output of the phase modulator is:

$$v(t)=\mathrm{Sin}(\omega t+S_1 S_2 \beta_1+S_1 \pi/2+S_1 S_3 \beta_2) \qquad (6)$$

From interplex modulation theory, it is known that the output transmission signal v(t) given by equation (1) can be equivalently expressed as:

$$v(t)=S_1 \cos(\beta_1)\cos(\beta_2)\sin(\omega t)+S_2 \sin(\beta_1)\cos(\beta_2)\cos(\omega t)+S_3 \cos(\beta_1)\sin(\beta_2)\cos(\omega t)-S_1 S_2 S_3 \sin(\beta_1)\sin(\beta_2)\sin(\omega t) \qquad (7)$$

where $0 \leq \beta_1 \leq \pi/2$ radians and $0 \leq \beta_2 \leq \pi/2$ radians and therefore $\mathrm{Sin}(\beta_1)$, $\mathrm{Sin}(\beta_2)$, $\mathrm{Cos}(\beta_1)$, and $\mathrm{Cos}(\beta_2) \geq 0$, such that the computed signal attenuations are never negative.

The resulting modulator output signal v(t) has a constant envelope; thus, a saturated amplifier can be used to transmit this signal without backoff. The first three terms in equation (7) correspond to the desired signal terms $S_1$, $S_2$ and $S_3$, respectively. By controlling the values of gains $\beta_1$ and $\beta_2$, the relative power levels of the signals $S_1$, $S_2$ and $S_3$ within the composite signal can be controlled. The fourth term is an intermodulation (IM) product, which is a residual term generated by the modulator. Although the IM product consumes some of the available power, the IM product serves to keep the amplitude of the composite signal envelope constant, which in turn facilitates use of saturated amplifiers. Thus, interplex modulation is a technique for combining three or more signals (e.g., three distinct data streams) into a constant-envelope composite signal that can efficiently be transmitted by a saturated amplifier.

Binary Offset Carrier (BOC) modulation is a technique that permits modulation at a frequency that is offset from a main RF carrier frequency. In the frequency domain, an offset carrier code has a main lobe that is offset from the main RF carrier frequency $f_{carrier}$ (or $\omega/2\pi$). In a standard BOC modulation scheme, an offset carrier code can be generated, for example, by multiplying a conventional PN code by a square wave of frequency $f_s$ before modulation of the main carrier $f_{carrier}$, resulting in sidelobe signals at two offset frequencies, namely, the sum and difference frequencies ($f_{carrier}+f_s$) and ($f_{carrier}-f_s$). A BOC modulated signal can be treated as any other signal, and combined with other signals to generate a constant envelope composite signal using, for example, Interplex Modulation. An advantage of using an offset carrier generated in this manner is that a single amplifier and transmitter can be used to transmit signals at two or more separate frequencies, with different codes on each frequency. For example one or more PN codes can be transmitted on the main carrier frequency $f_{carrier}$ (main carrier codes), while one or more different PN codes can be transmitted on an offset carrier frequency $f_{carrier}-f_s$ (offset carrier codes) by combining the main carrier code(s) and the offset carrier code(s) and modulating the RF carrier $f_{carrier}$ with the combined codes. It would be preferable to accomplish this while maintaining a constant envelope on the overall composite signal so that a saturated amplifier can be used.

The standard (real) BOC modulation technique results in two offsets at frequencies ($f_{carrier}+f_s$) and ($f_{carrier}-f_s$). If only one of the two offset frequencies is desired, say ($f_{carrier}-f_s$), filtering can be used to eliminate the other, undesired offset frequency. However, if filtering is used to eliminate the undesired offset before amplification, the filter destroys the constant envelope characteristic of the signal. If the filtering is performed after amplification, half of the total power output has been wasted in the extraneous offset. Neither of these options is desirable.

A known complex BOC modulation scheme for generating a single offset carrier by applying a separate BOC-type signal to the inphase (I) and quadrature (Q) components of the main carrier can also be employed. The individual BOC signals are phased such that the offsets on one side of the carrier reinforce, while the offsets on the opposite side cancel each other. Essentially, this can be accomplished by applying a sine phase square wave to either the inphase or quadrature component and a cosine phase of the same square wave frequency to the other component (i.e., the pn code is multiplied by two versions of the square wave, one with the cosine phase and the other with the sine phase). The individual BOC signals are phased such that, upon combining the two BOC signals, the offsets on one side of the carrier reinforce, while the offsets on the opposite side of the carrier cancel each other, leaving the single offset carrier signal. Using this method, the modem can generate a single-sideband waveform with an arbitrary carrier frequency offset.

According to an embodiment of the invention, BOC modulation is applied to separate fully independent data and ranging waveforms, which are then combined into a constant-envelope composite signal using interplex modulation. Essentially, a real (standard) BOC modulation is applied to the ranging signal stream resulting in a broadband ranging signal at the band edges of the transmission signal, while complex BOC modulation is applied to the data signal stream, resulting in a narrowband, frequency-agile single side-band data signal near the center of the transmission band. By way of a non-limiting example, the sine of the complex offset carrier (SOC) data signal and the cosine of the complex offset carrier (COS) can be the interplex modulator $S_1$ and $S_2$ signals, respectively, while the real BOC modulated ranging signal can the interplex modulator $S_3$, as will be explained below in greater detail.

Figure 6:
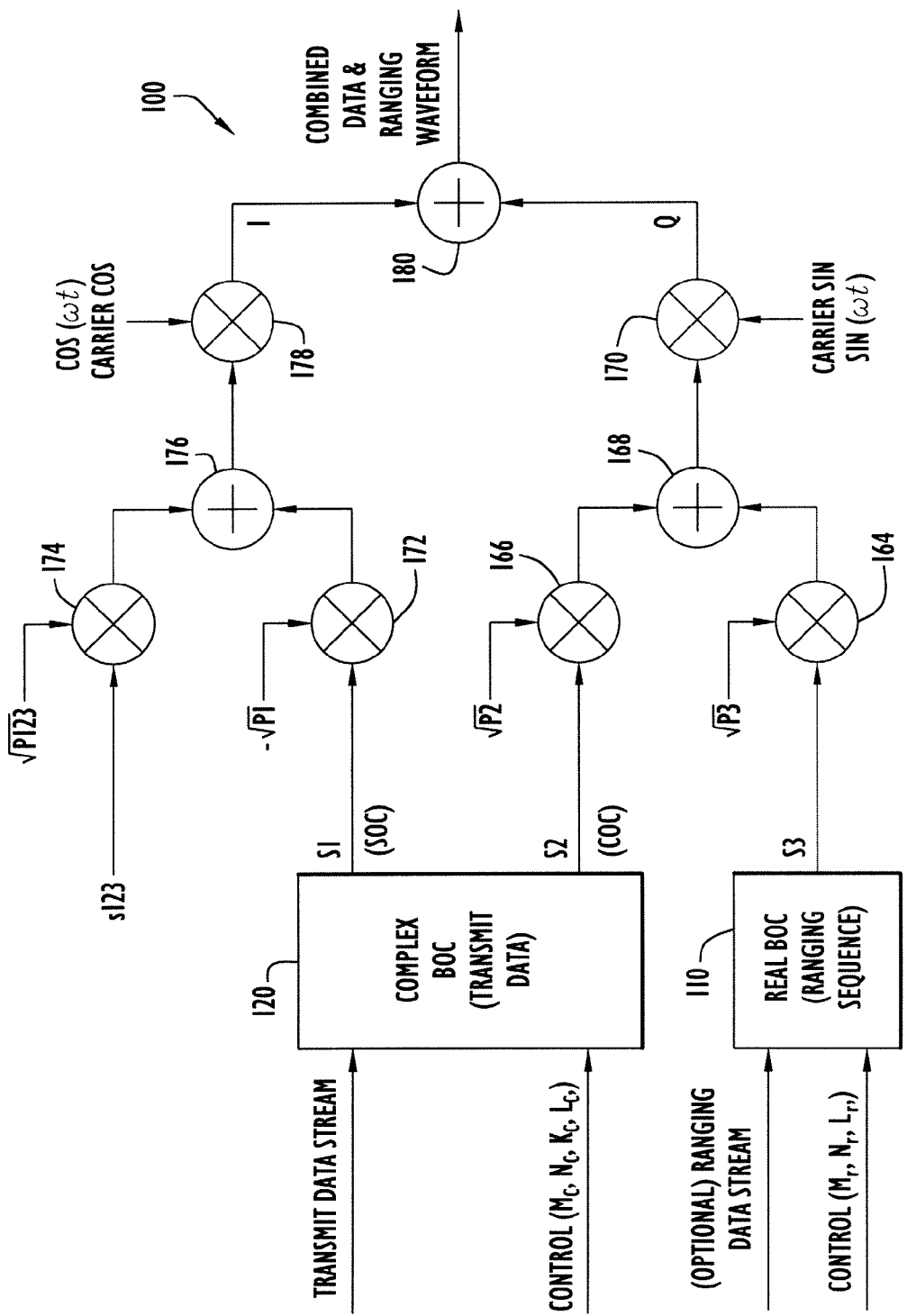
FIG. 6 is a block diagram conceptually illustrating a signal combining scheme in which a BOC-modulated ranging signal and a single-sideband-modulated data signal can be combined into a constant amplitude waveform using interplex modulation in accordance with an embodiment of the invention.

A conceptual block diagram of the exemplary signal combining scheme is illustrated in FIG. 6 in which a BOC-modulated ranging signal and a single-sideband-modulated data signal can be combined into a constant amplitude waveform using interplex modulation. A modem 100 includes a real BOC modulation module 110 which modulates the ranging signal and a complex BOC modulation module 120 that modulates the data signal. As used herein, the term module refers to any hardware or software implementation (or combinations thereof) that can be used to perform the described operation and does not necessarily imply a separate physical unit or structure or any particular circuit arrangement.

Figure 7:
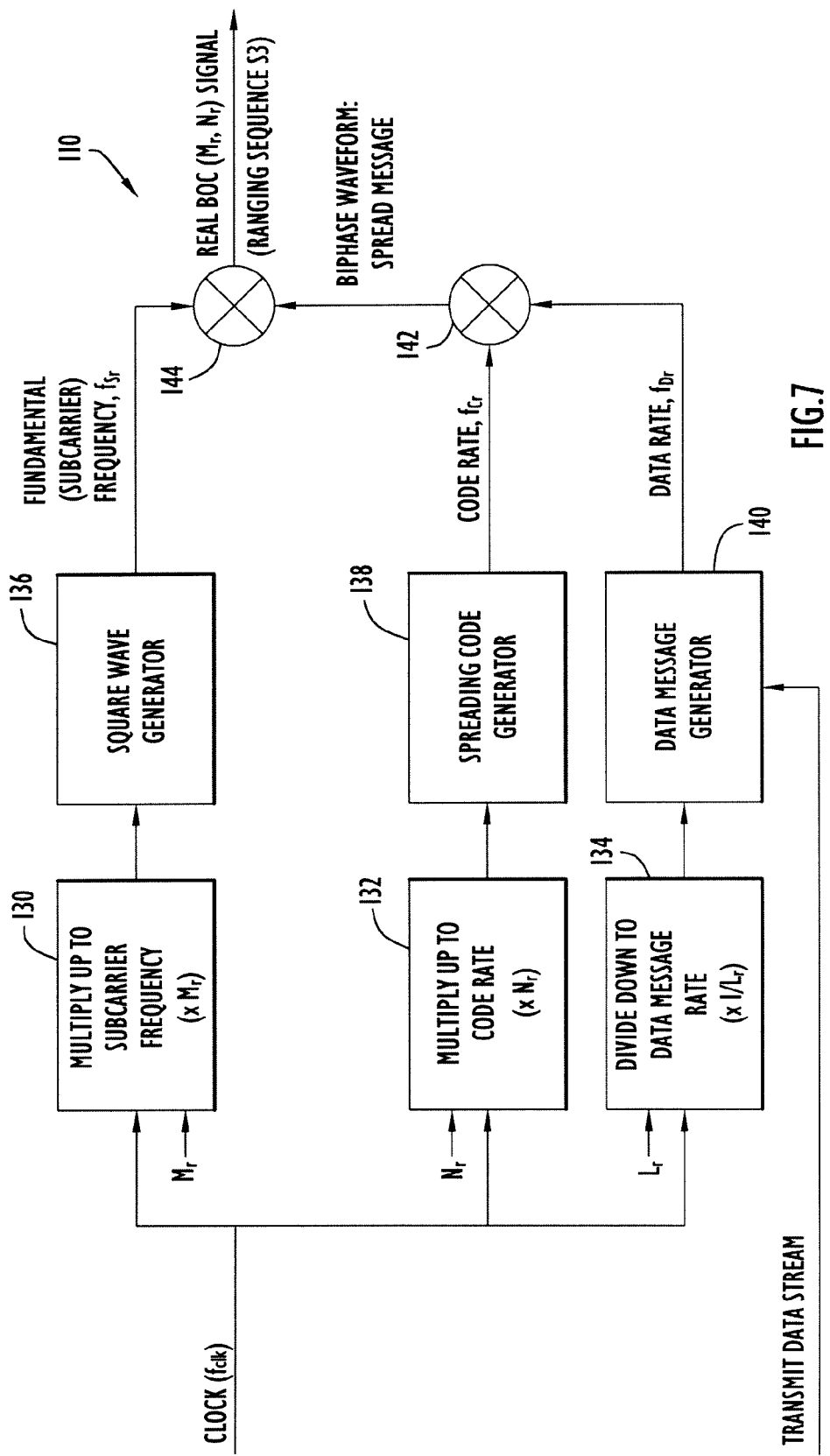
FIG. 7 is a detailed block diagram of an embodiment of the real BOC modulation module shown in FIG. 6.

The real BOC modulation module 110 is shown in greater detail in FIG. 7. The ranging signal in this example is signal stream comprising a pn code sequence having a code rate $f_{Cr}$. Optionally, a low-rate data sequence can be modulated onto the spreading code. This low-rate data sequence is an overlay signal which optionally allows additional data to be transmitted on the ranging signal. This data sequence would have a rate of $(1/L_r)*f_{clk}$ and a data rate $f_{Dr}$, as explained below. The subcarrier frequency $f_{Sr}$ is essentially the frequency of the square wave used to perform BOC modulation on the ranging signal, and results in a frequency offset $f_{Sr}$ from the main carrier center frequency $f_{carrier}$.

As shown in FIG. 6, control values $M_r$, $N_r$, and $L_r$ are supplied to real BOC modulation module 110 to control the ranging signal BOC modulation process (the subscript "r" refers to "real," indicating that the values relate to the signal sequence processed by the real BOC modulation module 110). In particular, as shown in FIG. 7, a clock signal having a nominal frequency $f_{clk}$ is supplied to a sub-carrier clock module 130, a code rate clock module 132, and a data message rate clock module 134. Control signals $M_r$, $N_r$, and $L_r$ are respectively supplied to the sub-carrier clock module 130, the code rate clock module 132, and the data message rate clock module 134.

Sub-carrier clock module 130 multiplies the clock signal at frequency $f_{clk}$ by the control value $M_r$ to produce a clock signal having the sub-carrier frequency $f_{Sr}$. The sub-carrier frequency clock signal is supplied to a square wave generator 136 which generates a square wave of fundamental sub-carrier frequency $f_{Sr}$.

Code rate clock module 132 multiplies the clock signal at frequency $f_{clk}$ by the control value $N_r$ to produce a clock signal having a frequency of the code rate $f_{Cr}$ (i.e., the rate of the pn spreading code). The code rate clock signal is supplied to a spread code generator 138 which generates the pn spread code at the code rate $f_{Cr}$.

Data message rate clock module 134 divides the clock signal at frequency $f_{clk}$ by the control value $L_r$ to produce a clock signal having the data message rate $f_{Dr}$. A data message generator 140 receives this data rate clock signal and the optional transmit data stream, and generates a ranging data message at a data rate of $f_{Dr}$. The ranging data message stream produced by data message generator 140 is modulated by the pn spreading code via mixer 142 to produce a spread message (biphase waveform). As used herein, the term "mixer" is not limited to an analog mixer and can include any digital or analog mixing or multiplication operation that results in a signal being modulated by another signal and can be implemented in hardware, software, or a combination of hardware and software.

Mixer 144 multiplies the spread message signal with the subcarrier square wave of frequency $f_{Sr}$ to produce a real binary offset carrier (BOC) signal designated by ($M_r$, $N_r$), where $M_r$ specifies the subcarrier frequency $f_{Sr}$ and $N_r$ specifies the code rate $f_{Cr}$ as multiples of the base clock frequency $f_{clk}$. In other words, the ranging signal has a fundamental (subcarrier) frequency of $M_r*f_{clk}$, and a spreading code rate of $N_r*f_{clk}$. As previously explained, there is an option to modulate a low-rate data sequence onto the spreading code. This data sequence would have a rate of $(1/L_r)*f_{clk}$. Referring again to FIG. 6, the real BOC signal generated by real BOC modulation module 110 represents the ranging sequence which serves as the signal $S_3$ in the subsequent interplex modulation with the outputs $S_1$ and $S_2$ of the complex BOC modulation module 120.

The complex BOC modulation module 120 (FIG. 6) generates a complex binary offset carrier signal containing the transmit data stream to be combined via interplex modulation with the ranging stream $S_3$. As shown in greater detail in FIG. 8, complex BOC modulation module 120 generates in-phase and quadrature BOC($M_c$, $N_c$) signals ($S_1$ and $S_2$) which are used to generate a single-sideband data signal using the previously described cancellation technique. Control values $M_c$, $N_c$, $K_c$, and $L_c$ are supplied to complex BOC modulation module 120 to control the complex BOC modulation process (the subscript "c" refers to "complex," indicating that the values relate to the signal sequences processed by the complex BOC modulation module 120). Note that, in general, the values of $M_c$, $N_c$, and $L_c$ supplied to complex BOC modulation module 120 need not be the same as the control values $M_r$, $N_r$, and $L_r$ supplied to the real BOC module 110 for generating the ranging sequence. The data signal has a fundamental (subcarrier) frequency of $M_c * f_{clk}$, which will become the offset frequency of the single-sideband signal. There is an option to further spread the data sequence, and if this option is exercised, the spreading code rate is $N_c * f_{clk}$.

Figure 8:
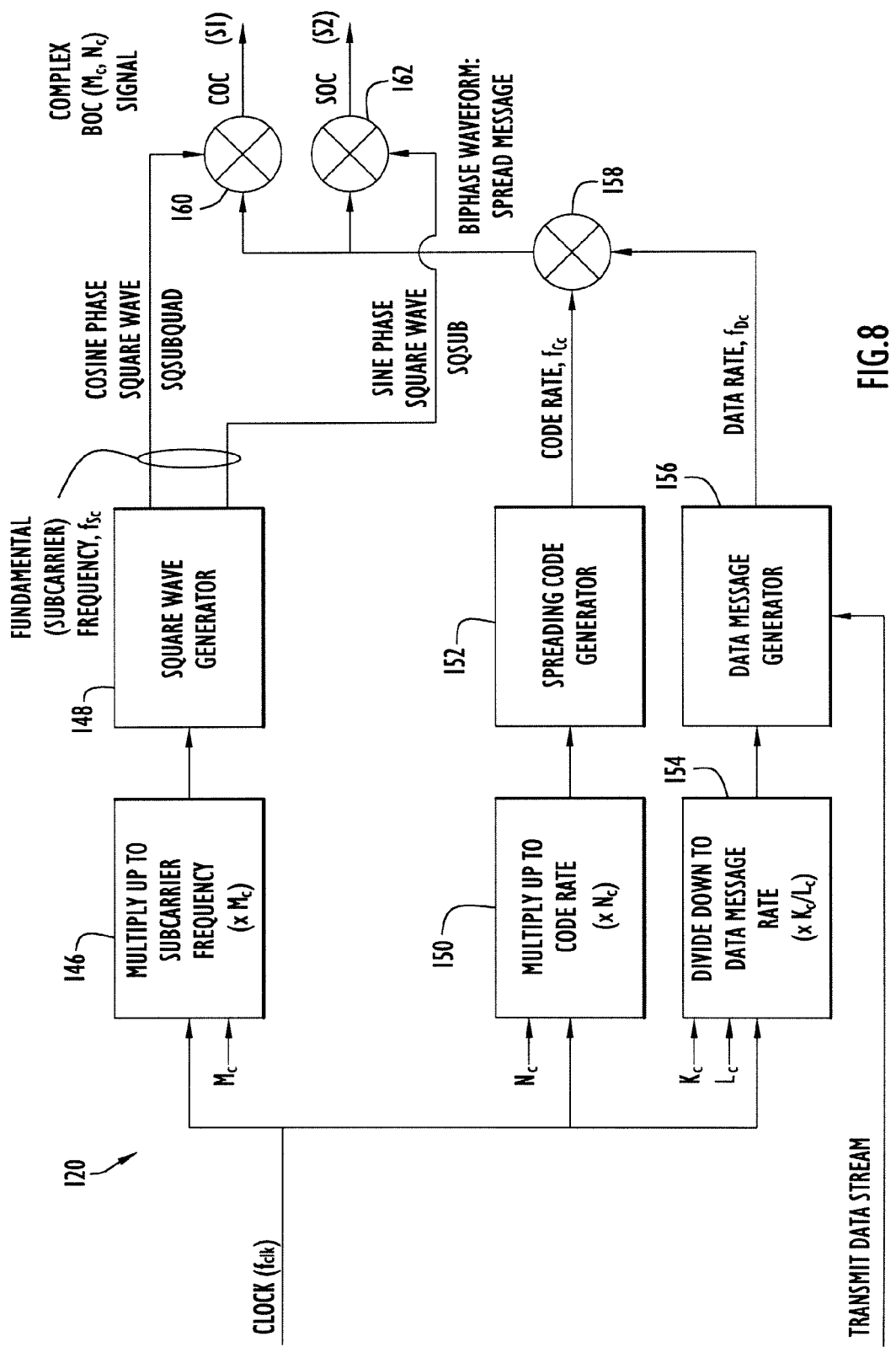
FIG. 8 is a detailed block diagram of an embodiment of the complex BOC modulation module shown in FIG. 6.

In particular, as shown in FIG. 8, a clock signal having a nominal frequency $f_{clk}$ is supplied to a sub-carrier clock module 146, a code rate clock module 150, and a data message rate clock module 154. Control signal $M_c$ is supplied to the sub-carrier clock module 146, control signal $N_c$ is supplied to the code rate clock module 150, and control signals $K_c$ and $L_c$ are supplied to the data message rate clock module 154.

Sub-carrier clock module 146 multiplies the clock signal at frequency $f_{clk}$ by the control value $M_c$ to produce a clock signal having the sub-carrier frequency $f_{Sc}$. The sub-carrier frequency clock signal is supplied to a square wave generator 148 which generates a square wave of fundamental sub-carrier frequency $f_{Sc}$ with a cosine phase (SQSUBQUAD) and a square wave of fundamental sub-carrier frequency $f_{Sc}$ with a sine phase (SQSUB). Note that by modifying the control value $M_C$, the sub-carrier frequency $f_{Sc}$ can be modified. This in turn modifies the carrier frequency on which the data signal is transmitted. Accordingly, by selectively modifying control value $M_C$ at desired points in time, the data signal can be made frequency agile within the center of the transmission band of the constant-envelope composite signal that is transmitted (i.e., between the bands at the edges of the transmission bands used for transmitting the ranging signal).

Code rate clock module 150 multiplies the clock signal at frequency $f_{clk}$ by the control value $N_c$ to produce a clock signal having a frequency of the code rate $f_{Cc}$ (i.e., the rate of the pn spreading code). The code rate clock signal is supplied to a spread code generator 152 which generates the pn spread code at the code rate $f_{Cc}$.

Data message rate clock module 154 multiples the clock signal at frequency $f_{clk}$ by the ratio $K_c/L_c$ to produce a clock signal having the data message rate $f_{Dc}$. A data message generator 156 receives this data rate clock signal and the optional transmit data stream and generates a ranging data message at a data rate of $f_{Dc}$. Thus, $f_{Dc}=(K_c/L_c)*f_{clk}$ is the over-the-air data rate of the data waveform of the constant-envelope composite signal. The data message stream produced by data message generator 156 is modulated by the pn spreading code via mixer 158 to produce a spread message (biphase waveform). This spread message waveform is supplied to a mixer 160 which modulates the waveform with the cosine phase of the square wave of the fundamental sub-carrier frequency $f_{Sc}$ (SQSUBQUAD) to produce the cosine phase of the complex BOC signal (COC). The spread message waveform is also supplied to a mixer 162 which modulates the waveform with the sine phase of the square wave of the fundamental sub-carrier frequency $f_{Sc}$ (SQSUB) to produce the sine phase of the complex BOC signal (SOC). The complex BOC signals COC and SOC generated by the complex BOC modulator module 120 represent the data sequence which serves as the signals $S_1$ and $S_2$ in the subsequent interplex modulation with the output $S_3$ of the real BOC modulation module 110. As previously explained, the subsequent combining of the SOC and COC signals results in a single offset sideband signal at the frequency $f_{carrier}-f_{Sc}$.

Referring again to FIG. 6, the binary signals $S_1$, $S_2$, and $S_3$ generated by the above-described real and complex binary offset carrier modulators are subsequently combined using interplex modulation before being sent to the RF modulators. Interplex modulation is described in a paper by Butman and Timor which contains a mathematical derivation of this combining technique. From the Butman and Timor equation, a three-channel Interplex PSK/PM System can be described by the expression:

$$\sqrt{2P}\sin(\omega_c t+\theta_1 s_1+\theta_2 s_2+\theta_3 s_3) \qquad (8)$$

Expanding the trigonometric sum yields:

$$\sqrt{2P}\sin(\omega_c t)\cos(\theta_1 s_1)\cos(\theta_2 s_2)\cos(\theta_3 s_3)-\sqrt{2P}\\
\sin(\omega_c t)\cos(\theta_1 s_1)\sin(\theta_2 s_2)\sin(\theta_3 s_3)-\sqrt{2P}\sin\\
(\omega_c t)\sin(\theta_1 s_1)\sin(\theta_2 s_2)\cos(\theta_3 s_3)-\sqrt{2P}\sin(\omega_c t)\\
\sin(\theta_1 s_1)\cos(\theta_2 s_2)\sin(\theta_3 s_3)+\sqrt{2P}\cos(\omega_c t)\sin\\
(\theta_1 s_1)\cos(\theta_2 s_2)\cos(\theta_3 s_3)-\sqrt{2P}\cos(\omega_c t)\sin\\
(\theta_1 s_1)\sin(\theta_2 s_2)\sin(\theta_3 s_3)+\sqrt{2P}\cos(\omega_c t)\cos\\
(\theta_1 s_1)\sin(\theta_2 s_2)\cos(\theta_3 s_3)+\sqrt{2P}\cos(\omega_c t)\cos\\
(\theta_1 s_1)\cos(\theta_2 s_2)\sin(\theta_3 s_3) \qquad (9)$$

This expression can be simplified because $s1=s2=s3=\{+1,-1\}$, hence $$\cos(\theta_1 s_1)=\cos(\theta_1)$$

$$\cos(\theta_2 s_2)=\cos(\theta_2)$$

$$\cos(\theta_3 s_3)=\cos(\theta_3)$$

$$\sin(\theta_1 s_1)=s_1\sin(\theta_1)$$

$$\sin(\theta_2 s_2)=s_1 s_2\sin(\theta_2)$$

$$\sin(\theta_3 s_3)=s_1 s_3\sin(\theta_3) \qquad (10)$$

and also, $s_1^2=1$ and $s_1^3=s_1$. As a result, the above expression simplifies to:

$$\sqrt{2P}\{\sin(\omega_c t)\cos(\theta_1)\cos(\theta_2)\cos(\theta_3)-\sin(\omega_c t)\cos(\theta_1)s_2\\
\sin(\theta_2)s_3\sin(\theta_3)-\sin(\omega_c t)\sin(\theta_1)s_2\sin(\theta_2)\cos\\
(\theta_3)-\sin(\omega_c t)\sin(\theta_1)\cos(\theta_2)s_3\sin(\theta_3)+\cos(\omega_c t)s_1\\
\sin(\theta_1)\cos(\theta_2)\cos(\theta_3)-\cos(\omega_c t)s_1\sin(\theta_1)s_2\sin\\
(\theta_2)s_3\sin(\theta_3)+\cos(\omega_c t)\cos(\theta_1)s_1 s_2\sin(\theta_2)\cos\\
(\theta_3)+\cos(\omega_c t)\cos(\theta_1)\cos(\theta_2)s_1 s_3\sin(\theta_3)) \qquad (11)$$

Collecting terms according to in-phase and quadrature yields:

$$\{\cos(\theta_1)\cos(\theta_2)\cos(\theta_3)-\cos(\theta_1)s_2\sin(\theta_2)s_3\sin(\theta_3)-\sin\\
(\theta_1)s_2\sin(\theta_2)\cos(\theta_3)-\sin(\theta_1)\cos(\theta_2)s_3\sin(\theta_3)\}\\
\sqrt{2P}\sin(\omega_c t)+\{s_1\sin(\theta_1)\cos(\theta_2)\cos(\theta_3)-s_1\sin\\
(\theta_1)s_2\sin(\theta_2)s_3\sin(\theta_3)+\cos(\theta_1)s_1 s_2\sin(\theta_2)\cos\\
(\theta_3)+\cos(\theta_1)\cos(\theta_2)s_1 s_3\sin(\theta_3)\}\sqrt{2P}\cos(\omega_c t) \qquad (12)$$

Applying definitions:

$$P_c = P\cos(\theta_1)^2\cos(\theta_2)^2\cos(\theta_3)^2 \qquad (13)$$

$$\sqrt{2P}$$

-continued $$\left\{ \frac{\sin(\omega_c t)\sqrt{P_c}}{\sqrt{P}} - \sin(\omega_c t)\cos(\theta_1)s_2\sin(\theta_2)s_3\sin(\theta_3) - \sin(\omega_c t)\sin(\theta_1) \right.$$

$$s_2\sin(\theta_2)\cos(\theta_3) - \sin(\omega_c t)\sin(\theta_1)\cos(\theta_2)s_3\sin(\theta_3) +$$

$$\cos(\omega_c t)s_1\sin(\theta_1)\cos(\theta_2)\cos(\theta_3) - \cos(\omega_c t)s_1\sin(\theta_1)s_2$$

$$\sin(\theta_2)s_3\sin(\theta_3) + \cos(\omega_c t)\cos(\theta_1)s_1s_2\sin(\theta_2)\cos(\theta_3) +$$

$$\left. \cos(\omega_c t)\cos(\theta_1)\cos(\theta_2)s_1s_3\sin(\theta_3) \right\}$$

$$P_{23} = P\cos(\theta_1)^2 \sin(\theta_2)^2 \sin(\theta_3)^2$$

$$P_2 = P\sin(\theta_1)^2 \sin(\theta_2)^2 \cos(\theta_3)^2$$

$$P_3 = P\sin(\theta_1)^2 \cos(\theta_2)^2 \sin(\theta_3)^2$$

$$P_1 = P\sin(\theta_1)^2 \cos(\theta_2)^2 \cos(\theta_3)^2$$

$$P_{123} = P\sin(\theta_1)^2 \sin(\theta_2)^2 \sin(\theta_3)^2$$

$$P_{12} = P\cos(\theta_1)^2 \sin(\theta_2)^2 \cos(\theta_3)^2$$

$$P_{13} = P\cos(\theta_1)^2 \cos(\theta_2)^2 \sin(\theta_3)^2$$

$$\left(\sqrt{2P_c} - \sqrt{2P_{23}}\, s_2 s_3 - \sqrt{2P_2}\, s_2 - \sqrt{2P_3}\, s_3\right)\sin(\omega_c t) +$$
$$\left(\sqrt{2P_1}\, s_1 - \sqrt{2P_{123}}\, s_1 s_2 s_3 + \sqrt{2P_{12}}\, s_1 s_2 + \sqrt{2P_{13}}\, s_1 s_3\right)\cos(\omega_c t)$$

Examining the effect of setting $\theta_1$ to $\pi/2$:
1) Reevaluate power factors:

$$P_1 = P\cos(\theta_2)^2 \cos(\theta_3)^2$$

$$P_2 = P\sin(\theta_2)^2 \cos(\theta_3)^2$$

$$P_3 = P\cos(\theta_2)^2 \sin(\theta_3)^2$$

$$P_c = 0$$

$$P_{12} = 0$$

$$P_{13} = 0$$

$$P_{23} = 0$$

$$P_{123} = P\sin(\theta_2)^2 \sin(\theta_3)^2 \quad (14)$$

2) Reevaluate equation with new power factors:

$$\sqrt{2P}\sin(\omega_c t)s_2 \sin(\theta_2)\cos(\theta_3) - \sqrt{2P}\sin(\omega_c t)s_3 \cos(\theta_2)$$
$$\sin(\theta_3) + \sqrt{2P}\cos(\omega_c t)s_1 \cos(\theta_2)\cos(\theta_3) - \sqrt{2P}\cos$$
$$(\omega_c t)s_1 s_2 s_3 \sin(\theta_2)\sin(\theta_3) \quad (15)$$

3) Simplify and collect terms according to in-phase and quadrature:

$$-\sqrt{2}(s_2\sqrt{P_2}+s_3\sqrt{P_3})\sin(\omega_c t)-\sqrt{2}(-s_1\sqrt{P_1}+s_1 s_2 s_3 \sqrt{P_{123}})\cos(\omega_c t) \quad (16)$$

As shown in the center of FIG. 6, the binary signals out of the complex BOC modulator module 120 and the real BOC modulator module 110 are combined together before being sent to the RF modulators. The combining weights are the square roots of the signal powers. $P_1$ is the signal power of the in-phase part (sine of the complex BOC) of the data signal ($S_1$); thus, per equation (16), multiplier 172 multiplies signal stream $S_1$ by $-P_1^{1/2}$ to produce a weighted $S_1$ signal stream. Multiplier 172 can be any suitable gain or attenuator mechanism capable of adjusting the signal amplitude. Likewise, $P_2$ is the signal power of the quadrature part (cosine of the complex BOC) of the data signal ($S_2$). Thus, per equation (16), multiplier 166 multiplies signal stream $S_2$ by $P_2^{1/2}$ to produce a weighted $S_2$ signal stream. Note that in order to achieve sideband cancellation and generate a single-sideband data waveform, $P_1$ must be equal to $P_2$. This constraint is not typically required in interplex modulation in general, but is required in this context, since $S_1$ and $S_2$ represent a complex BOC signal, and upon combining, the second sideband will be fully canceled only if the amplitudes of the two complex components are the same.

$P_3$ is the signal power of the ranging signal ($S_3$), i.e., the output of real BOC modulator module 110. Thus, multiplier 164 multiplies signal stream $S_3$ by $P_3^{1/2}$ to produce a weighted $S_3$ signal stream. $P_{123}$ is the cross-modulation power that is required in order to generate a constant amplitude signal, as previously described. If $P_1=P_2$, then $P_{123}$ must be set equal to $P_3$. If $S_1$, $S_2$, and $S_3$ take on the values +1 or −1, then $S_{123}$ is the product of $S_1$, $S_2$, and $S_3$, and also takes on the values +1 or −1. Multiplier 174 multiplies $S_{123}$ by $P_{123}^{1/2}$ to produce the cross-modulation sequence, i.e., the weighted $S_{123}$ signal stream.

As shown at the right of FIG. 6, the signals are combined and RF-modulated to the desired carrier frequency $f_{carrier}$ (or $\omega/2\pi$), which results in the desired constant-amplitude combined data and ranging RF waveform. In particular, the weighted $S_1$ signal generated by multiplier 172 and the weighted intermodulation product $S_{123}$ generated by multiplier 174 are combined by combiner 176, and RF mixer 178 modulates the cosine of the carrier frequency ($\cos(\omega t)$) with the output of combiner 176 to produce the in-phase (I) channel RF signal. Similarly, the weighted $S_2$ signal generated by multiplier 166 and the weighted $S_3$ signal generated by multiplier 164 are combined by combiner 168, and RF mixer 170 modulates the sine of the carrier frequency ($\sin(\omega t)$) with the output of combiner 168 to produce the quadrature (Q) channel RF signal. A combiner 180 combines the modulated I and Q channel RF carriers to produce the constant-envelope composite signal, which can be amplified and transmitted via an antenna (not shown). Any suitable mechanism can be used to combine the modulated I and Q components of the RF carrier.

The architectures depicted in FIGS. 6-8 are conceptual and do not necessarily suggest specific implementations or physical relationships. For example, the modulation schemes shown therein can be implemented with any suitable analog circuitry, digital circuitry or combinations thereof, and the required signal processing can be performed via any suitable hardware, software, or combinations thereof. Thus, while gain/attenuator (multiplier) elements, mixers, and combiners are shown conceptually in FIG. 6 to perform interplex modulation, any suitable mechanisms can be used to implement an interplex modulator.

Figure 9:
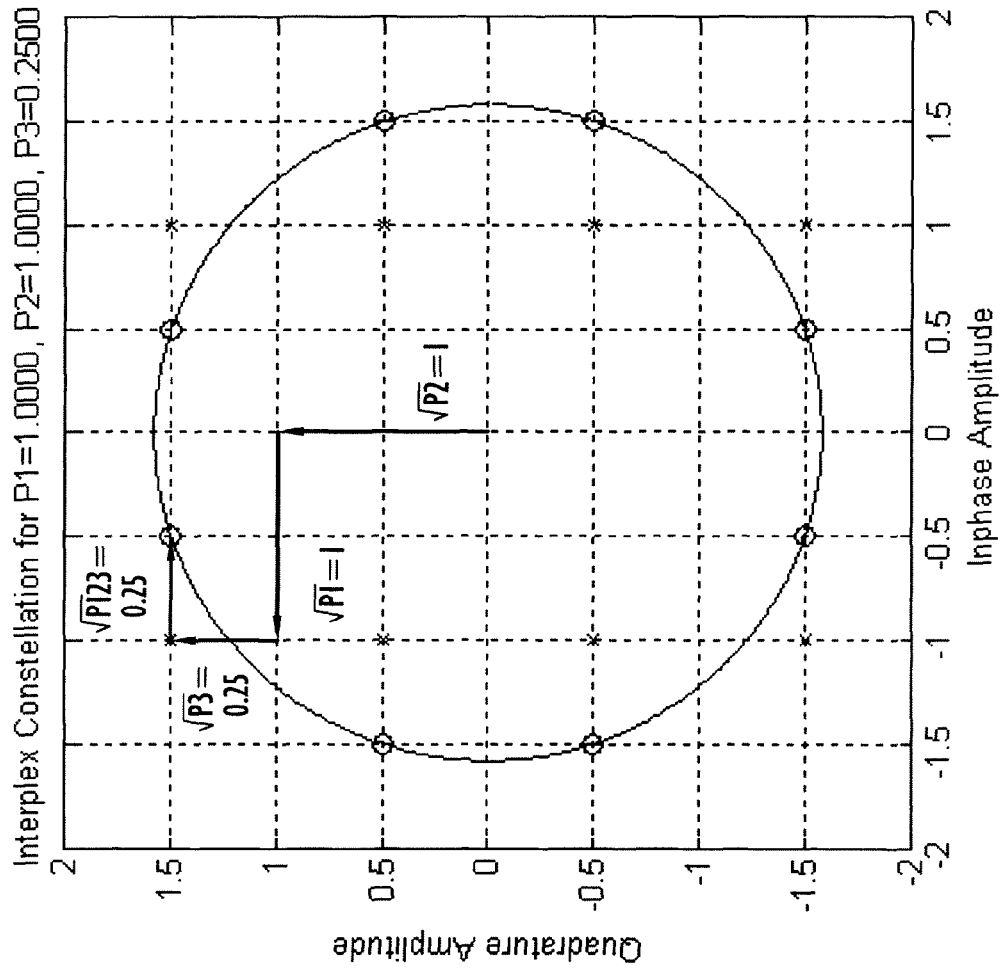
FIG. 9 is an interplex constellation diagram illustrating an example of power factors that result in a constant amplitude signal constellation.

To illustrate the interplex modulation concept in the context of present invention, a simple example is provided. Suppose one sets $P_1=P_2=1$, and $P_3=0.25$. The resulting modem constellation diagram is shown in FIG. 9. As can be seen in FIG. 9, the two contributing powers on the quadrature axis (lower path, "carrier sin", Q) are $P_2$ and $P_3$. These appear in FIG. 9 as the large and small vertical arrows. The large horizontal arrow in FIG. 9 is the contribution from $P_1$ on the in-phase axis (upper path, "carrier cos", I in FIG. 9). The sums of the vectors corresponding to $P_1$, $P_2$, and $P_3$ are marked in FIG. 9 by "x" symbols. Note that these symbols are not on the constant amplitude circle. However when the vector corresponding to $P_{123}$, the cross-modulation power, is added to these symbols, they move onto the constant amplitude circle, as marked in FIG. 9 by "o" symbols. This is a graphical demonstration of how the interplex scheme is able to generate a constant amplitude signal.

The high efficiency of interplex modulation can be seen as follows. The useful transmitted power is $P_1+P_2+P_3$. The total power is $P_1+P_2+P_3+P_{123}$. Therefore the efficiency is:

$$\text{Efficiency} = \frac{P1 + P2 + P3}{P1 + P2 + P3 + P123} = \frac{1 + 1 + 0.25}{1 + 1 + 0.25 + 0.25} = 90\%$$

Figure 10:
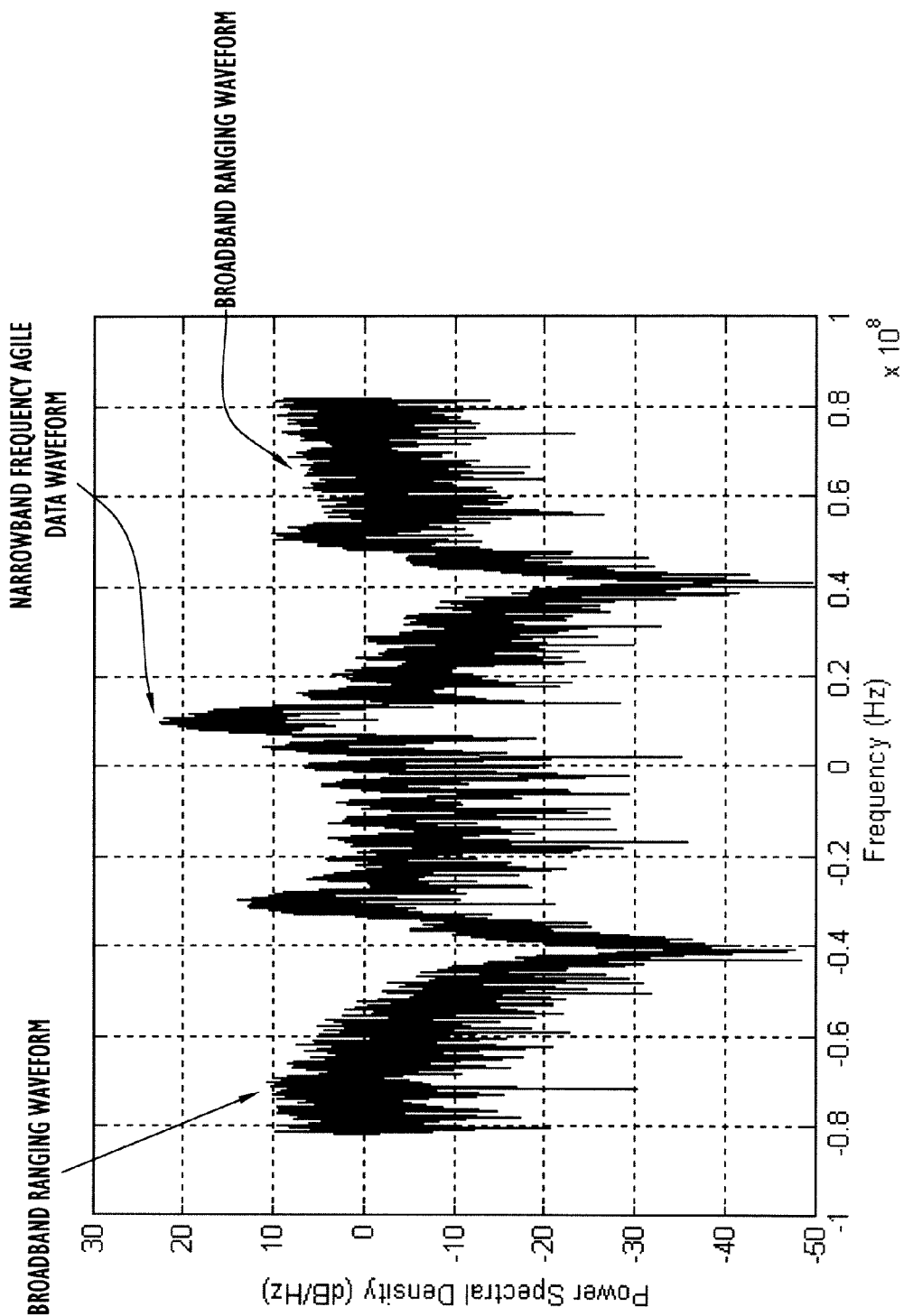
FIG. 10 is a graph illustrating the spectrum of a narrowband, frequency-agile data waveform and a broadband ranging waveform transmitted via a constant-envelope composite signal according to an embodiment of the invention.

The spectrum for this example is shown in FIG. 10. In this case, the ranging waveform is a BOC(80,40) signal with $f_{clk}$=1.023 MHz, having spectral peaks centered at +/−81.84 MHz, and 40.92 MHz spreading (visible as the peak-to-null spacing). The data waveform is a 4.096 Mbps signal, arbitrarily set at a 10.23 MHz frequency offset.

Two spurs can be seen in FIG. 10, located at frequencies four times the frequency offset away from the main data waveform peak. These spurs are due to the subcarrier being a square wave rather than a sine wave. If these spurs happen to fall within the spectrum of the ranging waveform, they should not cause a problem, because the data waveform is not correlated with the ranging waveform.

A number of techniques can be used to manage the effects of the spurs so that they do not degrade the ranging performance. For example, in the transmitter, the power ratios of the data and ranging waveforms can be controlled so that the spreading gain for the ranging waveform is sufficient to render any errors due to the spurs inconsequential. Note that the largest spur is already 9.5 dB down from the data waveform's main lobe. This method for dealing with the spurs is advantageous, since it requires no additional functions in the receiver. Another approach is to excise the spurs from the ranging waveform in the receiver before performing correlations. Note that the spurs are at known frequencies, making this techniques feasible. Another option is to regenerate the transmitted waveform in the receiver based on the received data waveform, and then using the regenerated waveform to cancel the spurs before performing correlations. Yet another option is to establish "keep out" frequency zones for the data waveform in the transmitter so that the spurs will not fall on top of the ranging waveform. This may be less desirable method for dealing with the spurs, since it limits the available frequencies for the data waveform.

Figure 11:
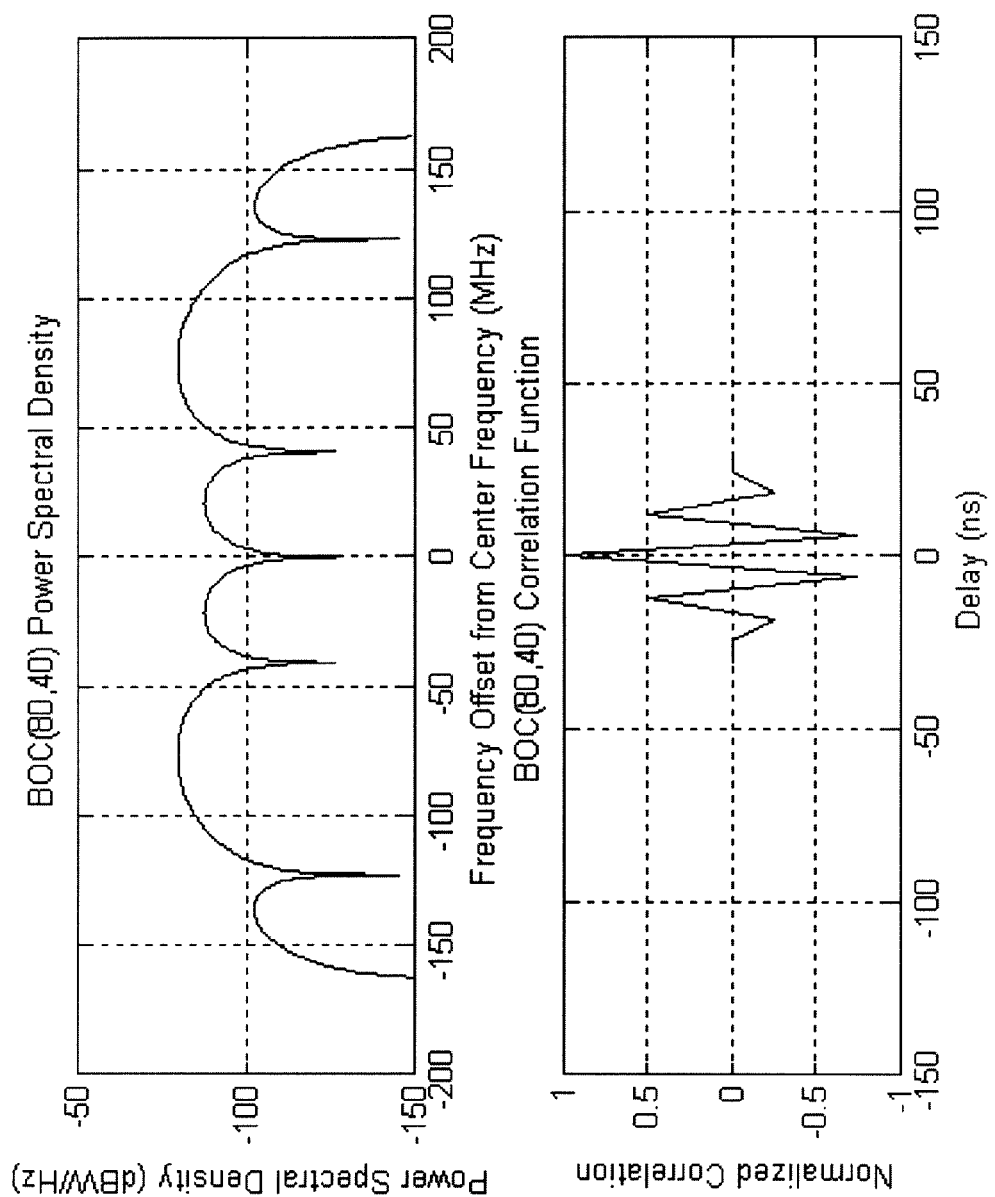
FIG. 11 is a graph illustrating the power spectral density and correlation function for a BOC (80,40) correlation function.
Figure 12:
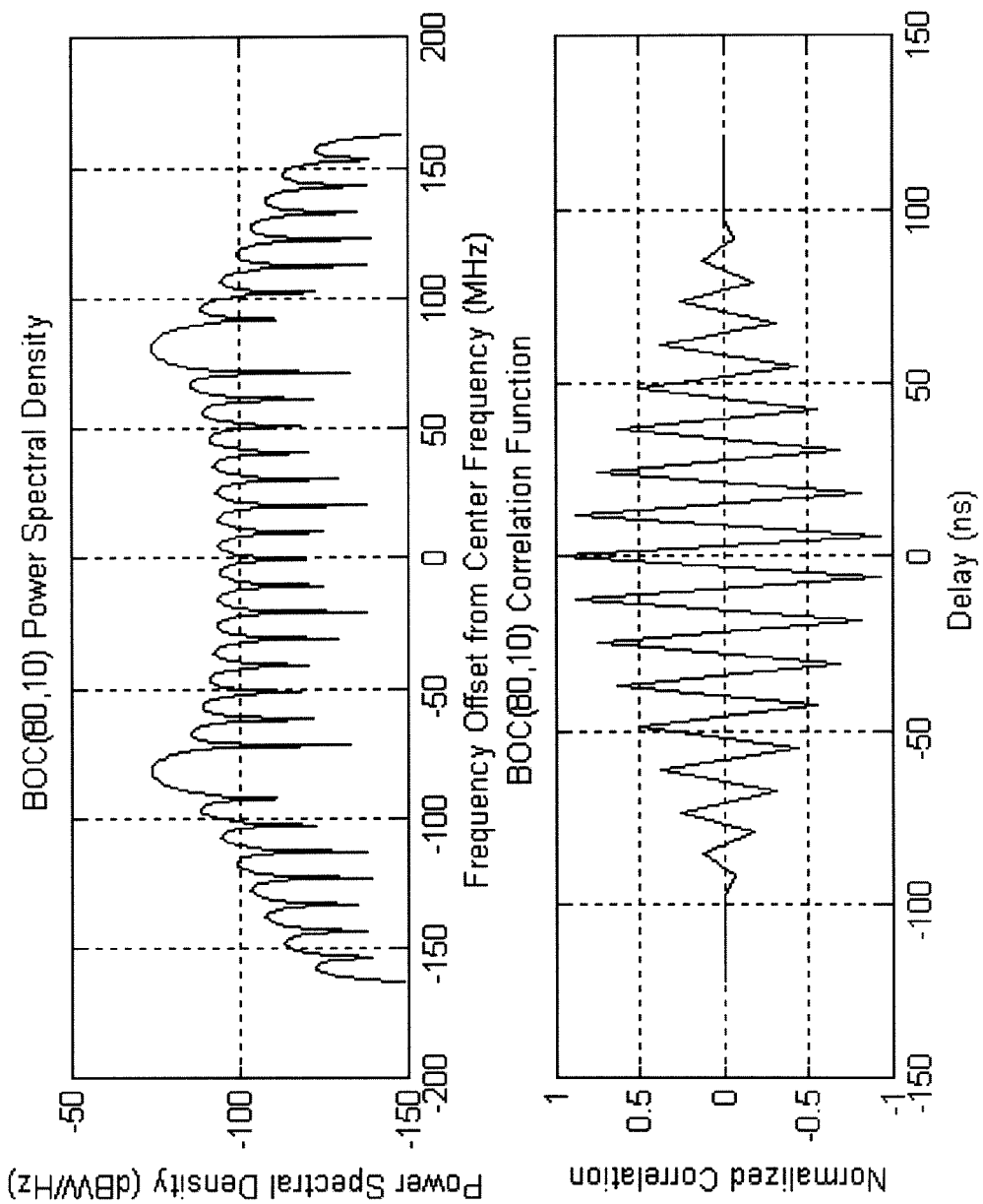
FIG. 12 is a graph illustrating the power spectral density and correlation function for a BOC (80,10) correlation function.

With regard to waveform spectral and autocorrelation properties, when deciding how much spreading to apply to the ranging signal, there is a tradeoff between the amount of bandwidth that remains available for the data signal and the amplitude ratio between largest autocorrelation peak and next largest autocorrelation peak. The larger this ratio, the easier it is to acquire and track the ranging signal. To see this tradeoff, consider FIG. 11, which shows the power spectral density (top) and normalized correlation (bottom) of a BOC(80,40) ranging signal, and FIG. 12 which shows the power spectral density (top) and normalized correlation (bottom) of a BOC (80,10) ranging signal. In FIG. 11, it can be seen that the BOC(80,40) signal has a 2:1 ratio between the amplitude of largest autocorrelation peak and next largest autocorrelation peak, which is excellent for initial signal acquisition. However, the broad extent of the spreading waveform reduces the bandwidth available for the data signal. In FIG. 12, the BOC (80,10) signal has a 1.14:1 ratio between the amplitude of the largest autocorrelation peak and the next largest autocorrelation peak. This is very challenging for initial signal acquisition, because the many correlation peaks with only slight differences in amplitude can result in false acquisitions, i.e., beginning to track the wrong peak. Once the correct peak has been acquired, however, it is probably feasible to continue to track its location. Note how the narrow extent of the spreading waveform makes additional bandwidth available for the data signal.

With the foregoing tradeoffs in mind, flexible modem operation can be employed with the modulation techniques of the present invention. For example, the transmitting and receiving modems can have an acquisition mode of operation during which they use a ranging waveform with excellent autocorrelation sidelobe properties. Once the signal has been acquired, they can switch to a tracking mode of operation which uses a waveform that maximizes the bandwidth available for the data signal. Accordingly, a waveform such as that shown in FIG. 11 can be used during acquisition, while a waveform such as that shown in FIG. 12 can subsequently be used during ongoing tracking to provide maximum bandwidth for the data signal.

If the receiving modem experiences interference from a narrowband jammer, it can request the transmitting modem to change to a different frequency for the data signal, as described above. If the two modems periodically attempt transmission on different frequencies, they can keep track of which frequencies have interferers and which ones are clear. Alternately, the receiving modem can periodically measure the spectrum of the entire band using an FFT, and it can then determine frequency zones that are relatively free of interference.

Although the foregoing description primary focuses on frequency avoidance of a non-hostile jammer, note that another approach to overcoming interference from a narrowband jammer would be to constantly frequency hop the data signal. If a hostile jammer were attempting to follow the data signal, it may be possible to hop the frequency of the data waveform quickly enough that the jammer cannot detect and jam the signal before the modem hops to a different frequency.

If the receiving modem experiences broadband interference, perhaps due to the sun, the modem can request the transmitting modem to transmit at a lower bit rate. If the transmitter continues to transmit at the same power level, lowering the bit rate will increase the spectral density of the transmitted data signal. Simultaneously, the receiving modem can switch to a narrower bandpass filter on the received signal in order to reject more of the broadband interfering signal. These actions on the part of the transmit and receive modems will increase the signal-to-jammer power ratio and improve the system's performance versus the broadband interferer.

The techniques of the invention are applicable to any type of radio system that needs simultaneous high-accuracy ranging and high data transmission rate. Such systems may include: satellite communication and ranging links at LEO, MEO, and GEO orbits; satellites or aircraft flying in formation; terrestrial radio systems that need position location as well as data transmission (these systems span a range from tactical radio systems to commercial cell phones); and time transfer systems that require a simultaneous high-rate data channel.

More generally, the combination of binary offset carrier (BOC) modulation and interplex modulation described herein may be useful in any context where desirable to transmit two or more distinct signals with independently controllable power levels, bandwidths, and/or data rates within a constant-envelope composite signal. This may be useful in a wide variety of communication and navigation applications that transmit signals on multiple carriers or frequency channels, including terrestrial, airborne, and satellite-based communication systems and satellite navigation systems such as the GPS and Galileo systems.

Having described embodiments of the invention, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A system for combining a plurality of signals to form a constant-envelope composite signal, comprising:
 a complex binary offset carrier (BOC) modulator configured to perform BOC modulation on a first signal to generate first and second complex BOC signals;
 a real BOC modulator configured to perform BOC modulation on a second signal to generate a real BOC signal; and
 an interplex modulator configured to combine the first and second complex BOC signals and the real BOC signal via interplex modulation to form a constant-envelope composite signal, wherein the first and second signals are components of the constant-envelope composite signal.

2. The system of claim 1, wherein power levels of the first and second signals are independently controllable via the interplex modulator.

3. The system of claim 1, wherein data rates of the first and second signals are independently controllable via the complex and real BOC modulators.

4. The system of claim 1, wherein bandwidths of the first and second signals are independently controllable via the complex and real BOC modulators.

5. The system claim 1, wherein the system generates the constant-envelope composite signal as a multi-carrier constant-envelope signal.

6. The system of claim 1, wherein the first signal is a data signal and the second signal is a ranging signal.

7. The system of claim 1, wherein a transmission band of the constant-envelope composite signal includes a center portion and edge portions, wherein a carrier frequency in the center portion is modulated with the first signal and carrier frequencies in the edge portions are modulated with the second signal.

8. The system of claim 1, wherein the complex BOC modulator is configured to modify a sub-carrier frequency such that the first signal is a frequency-agile signal within the constant-envelope composite signal.

9. The system of claim 1, wherein the system comprises satellites and the constant envelope composite signal is a satellite crosslink signal for point-to-point transmission between the satellites.

10. The system of claim 9, wherein the satellites communicate in a full duplex mode with constant-envelope composite signals that simultaneously carry data and ranging signals.

11. A modem, comprising:
 a transmitter including: a complex binary offset carrier (BOC) modulator configured to modulate a first BOC sub-carrier with a first transmit signal to generate first and second complex BOC signals; a real BOC modulator configured to modulate a second BOC sub-carrier with a second transmit signal to generate a real BOC signal; and an interplex modulator configured to combine the first and second complex BOC signals and the real BOC signal to form a constant-envelope composite transmit signal including the first and second transmit signals at different frequencies; and
 a receiver configured to receive a constant-envelope composite receive signal including first and second receive signals at different frequencies within a transmission band of the constant-envelope composite receive signal.

12. The modem of claim 11, wherein the first BOC sub-carrier of the complex BOC modulator results in the first transmit signal modulating a carrier signal in a center portion of a transmission band of the constant-envelope composite transmit signal and the second BOC sub-carrier of the real second BOC modulator results in the second transmit signal modulating a carrier signal in an edge portion of the transmission band of the constant-envelope composite transmit signal.

13. The modem of claim 11, wherein the power levels, data rates, and bandwidths of the first and second transmit signals are independently controllable by the modem.

14. The modem of claim 11, wherein the complex BOC modulator is configured to modify the first BOC sub-carrier such that the first transmit signal is a frequency-agile signal within the constant-envelope composite transmit signal.

15. A system, comprising:
 a first modem according to the modem of claim 11; and
 a second modem according to the modem of claim 11, wherein the first and second modems communicate in a full duplex mode in which first and second signals are simultaneously transmitted and received via constant-envelope composite signals.

16. The system of claim 15, wherein the first signal is a data signal and the second signal is a ranging signal.

17. A method of combining a plurality of signals to form a constant-envelope composite signal, the method comprising:
 performing complex binary offset carrier (BOC) modulation on a first signal, using a complex BOC modulator, to produce first and second complex BOC signals;
 performing real BOC modulation on a second signal, using a real BOC modulator, to produce a real BOC signal; and
 combining the first and second complex BOC signals and the real BOC signal via interplex modulation, using an interplex modulator, to form a constant-envelope composite signal containing the first and second signals.

18. The method of claim 17, further comprising:
 independently controlling power levels of the first and second signals.

19. The method of claim 17, further comprising:
 independently controlling data rates of the first and second signals.

20. The method of claim 17, further comprising:
 independently controlling bandwidths of the first and second signals.

21. The method of claim 17, wherein the first signal is a data signal and the second signal is a ranging signal.

22. The method of claim 17, wherein the constant-envelope composite signal is generated such that a carrier frequency in a center portion of a transmission band of the constant-envelope composite signal is modulated with the first signal and carrier frequencies in edge portions of the transmission band of the constant-envelope composite signal are modulated with the second signal.

23. The method of claim 17, wherein the constant-envelope composite signal is generated such that the first signal is a frequency-agile signal within the constant-envelope composite signal.

* * * * *